United States Patent [19]

Hubert et al.

[11] Patent Number: 4,496,621

[45] Date of Patent: Jan. 29, 1985

[54] REINFORCED IMPREGNATED GRAPHITE STRUCTURES AND PROCESS FOR MAKING SAME

[75] Inventors: Jean-Marie Hubert; Jean-Michel Bauer; Serge Mollet, all of Pagny sur Moselle, France

[73] Assignee: Le Carbone-Lorraine, Courbevoie, France

[21] Appl. No.: 498,735

[22] Filed: May 27, 1983

[30] Foreign Application Priority Data

May 28, 1982 [FR] France ............................ 82 09327

[51] Int. Cl.³ .............................................. B32B 5/02
[52] U.S. Cl. ............................... 428/236; 165/DIG. 8; 165/180; 427/299; 427/407.3; 428/238; 428/245; 428/251; 428/284; 428/285; 428/286; 428/408; 428/902
[58] Field of Search ............... 428/409, 287, 285, 286, 428/298, 302, 408, 236, 238, 245, 251, 284; 165/DIG. 8, 180; 427/407.1, 407.3, 299

[56] References Cited

U.S. PATENT DOCUMENTS 4,134,451  1/1979  Conant et al. ................... 165/180
4,367,260  1/1983  Krause ............................ 428/298

Primary Examiner—James J. Bell
Attorney, Agent, or Firm—Albert F. Kronman

[57] ABSTRACT

Disclosed are graphite articles impregnated with resin and having on at least a part of their surface a reinforcement of resin-impregnated fibers wherein the resin serves to integrally unite the graphite with the reinforcement. The articles are made by placing the reinforcement on at least a part of the graphite article, impregnating the resulting assembly with a heat-hardenable or thermoplastic resin and allowing the resin to harden.

9 Claims, 4 Drawing Figures

REINFORCED IMPREGNATED GRAPHITE STRUCTURES AND PROCESS FOR MAKING SAME

BACKGROUND OF THE APPLICATION

This application is based on a French application for Patent entitled Reinforced Impregnated Graphite Structures and Process for Making Same filed May 28th, 1982, No. EN 82 09327 by the applicants. Said date is relied upon and claimed under the Convention.

BACKGROUND OF THE INVENTION

The present invention is directed to reinforced, impregnated graphite articles and to a process for making such articles.

As used herein, the term "impregnated graphite" refers to artificial graphite rendered impervious by one or more impregnations with a resin, this resin being either a thermosetting or a thermoplastic resin.

Such impregnated graphite is used mainly in making industrial materials, in particular in the chemical industry where it can be used to form shapes such as columns and their accessories such as trays, injectors and the like, heat exchange units, plates for tubular exchangers and the like.

One of the drawbacks of impregnated graphite is that it has only average mechanical characteristics, in particular as regards resistance to traction and bending. Moreover, it is a soft material which has poor resistance to abrasion and wear. Because of these properties it is necessary to use very thick elements and sometimes the use of graphite is not possible, in particular in enclosures or apparatus subjected to internal pressure.

OBJECTS AND SUMMARY OF THE INVENTION

The main object of this invention is to improve the mechanical properties of impregnated graphite in order to avoid the above-mentioned drawbacks thereof.

This object is achieved in accordance with this invention which comprises a graphite article impregnated with resin and having on at least one side thereof a reinforcement of resin-impregnated fibers, the resin serving to intimately unite the impregnated graphite and the reinforcement.

The resin can be the same one used to impregnate the graphite, such as a thermosetting or thermoplastic resin. The reinforcement is placed on the article where the stresses and/or pressures are the highest.

Since the impregnated graphite and its reinforcement are intimately united, the reinforcement effectively adds to the resistance of the assembly.

It is evident that the placement of this reinforcement depends on the intended use of the article as will be evident from the following description.

OVERVIEW OF THE PATENT LITERATURE

Patents related to this subject matter include Swiss Pat. No. 493,342 to P. Welker; German Pat. Nos. 1,941,387 (Sigri); 1,928,373 (Brown, Boveri) and U.S. Pat. Nos. 3,550,213 (Ormsby) and 4,134,451 (Conant).

These in no way suggest or hint at the present invention.

DISCLOSURE OF BEST MODE

The fibers forming the reinforcement of the invention can be in the form of woven material, mats, wound threads, unidirectionally or cross-woven sheets.

The reinforcement can comprise one or several layers of the above types with the fibers in one layer having a different orientation from one layer to the other.

The fibers can be selected from the group of carbon, graphite, glass, silica alumina, boron; but this list is not exhaustive.

It is known also that certain fibers can have very high physical and mechanical characteristics and excellent corrosion resistance such as, for an example, carbon and graphite fibers. Accordingly, their characteristics can be used advantageously to locally "dope" the impregnated graphite article.

A process for making an article in accordance with the invention comprises placing on at least a part of an artificial graphitic article a fibrous reinforcement, impregnating the resulting assembly with resin and finally proceeding to harden the resin.

Modified embodiments of the above process can be resorted to according to the intended uses of the finished structure. Thus, the fibers can be pre-impregnated with resin and after partial hardening of the resin, the graphitic article can be, if need be, machined before totally impregnating the assembly.

The following examples illustrate in non-limiting fashion the invention.

EXAMPLE 1

Figure 1:
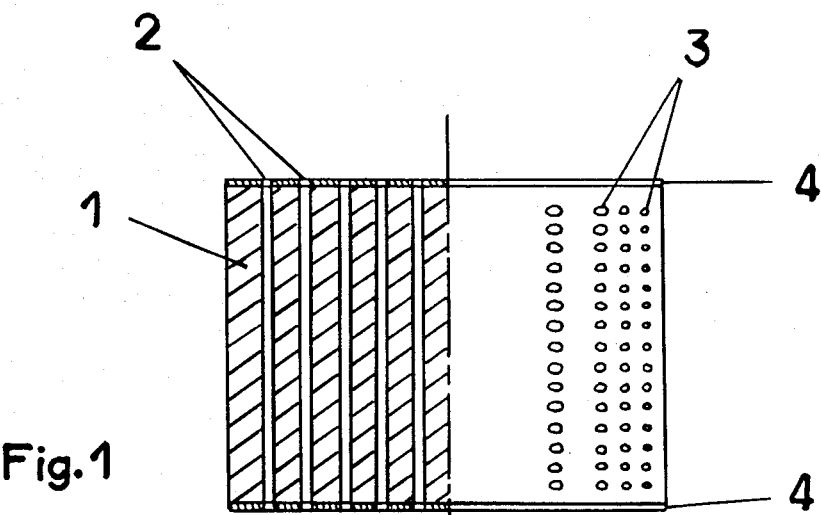
FIG. 1 is a partial cross-sectional view of a heat exchange block according to the invention.
Figure 2:
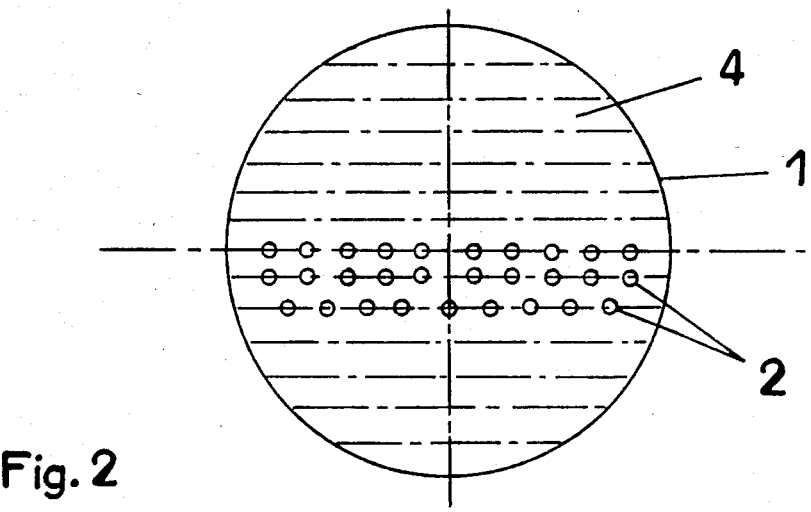
FIG. 2 is a top plan view of same.

This example relates to an application where the impregnated graphitic structure is a cylindrical block of a heat exchanger with crossed channels and is illustrated on FIGS. 1 and 2.

Referring descriptively to these figures, block 1 is formed of graphite impregnated with a phenolic resin and pierced by rows of channels 2 which are parallel to its axis and where circulates a corrosive liquid. The rows of channels 3 do not meet the other rows and are perpendicular to the axis of the block and in them will circulate the heat transfer fluid. On FIG. 2, only three rows of channels 2 have been shown for simplicity's sake. The other rows are represented by dashed lines.

The two sides of the block are each provided with a reinforcement 4 formed by several layers of carbon cloth impregnated with a phenolic resin.

This block can be obtained in the following manner.

The two sides of the block are covered with several layers of carbon cloth maintained in place with a prepolymerised phenolic resin. In this instance, this covering action is performed as follows: on each side of the block is placed a layer of carbon cloth which is swabbed with a prepolymerised phenolic (phenolformaldehyde) resin and the action is repeated with the other layers; after partial polymerisation of the resin, the two networks of channels are machined and, finally, the assembly of the block and its reinforcement is impregnated with a phenolic resin which is allowed to harden in known manner.

Optionally, the machining operation can be repeated in cases where shoulders of joints would be necessary.

Comparisons have been made between impregnated, but not reinforced, graphite blocks and blocks according to this example. It was observed that:

Without reinforcement, a graphite block 200 mm in diameter, 350 mm high, cracks under a compressive force of 30,000 daN.

Reinforced, this same type of block does not begin cracking until the application of a compressive force of 44,000 daN.

The importance of this invention in this field becomes evident. In effect, block-type heat exchangers are stacked on one another and held in place by an internal compressive force which ensures fluid-tightness. By considerably increasing the resistance to compression of the blocks, the always present danger of cracking is reduced.

Moreover, it was noted that the resistance to erosion demonstrated by the blocks of the invention is considerably increased. Trials have shown that the quantity of material removed, other things being equal, is up to six (6) times less than for not-reinforced blocks.

EXAMPLE 2

Figure 3:
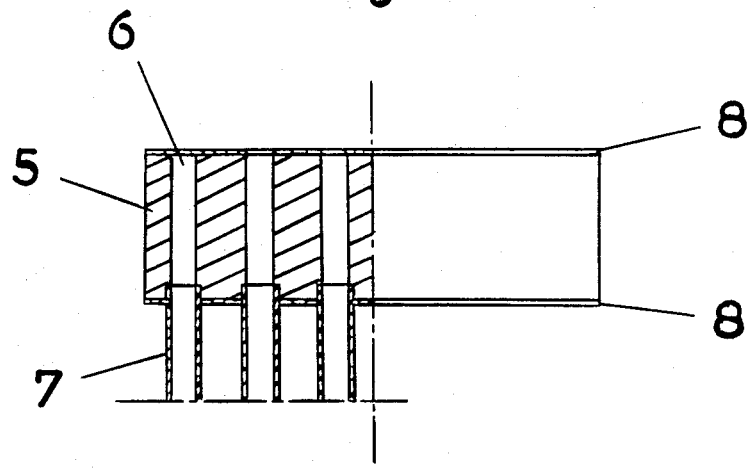
FIGS. 3 and 4 are the same as FIGS. 1 and 2 for a disk used in a tubular exchanger.
Figure 4:
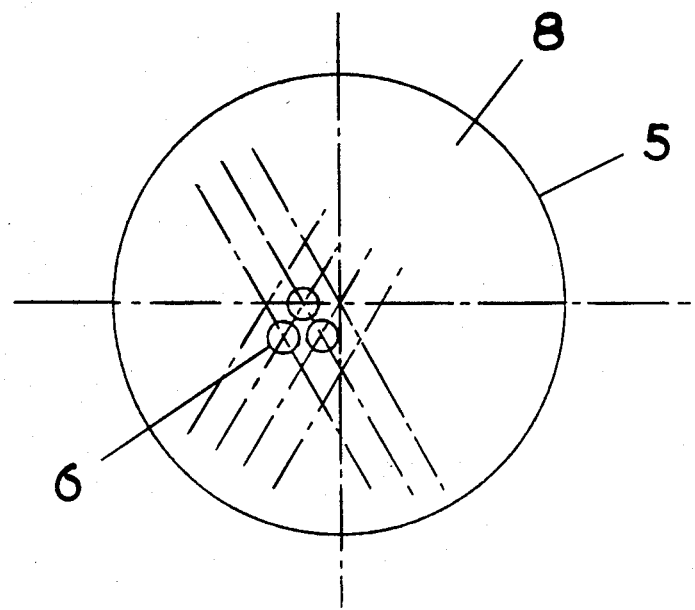

This example is concerned with an application where the article is a circular impregnated graphite disk of a tubular exchanger and is shown in FIGS. 3 and 4.

Referring descriptively to these figures, circular plate or disk 5 is formed of graphite impregnated with a phenolic resin and is pierced by a series of cylindrical holes 6 serving as housings for tubes 7 and for the passages for the corrosive fluid. FIG. 4 only shows a few holes 6 and a few locations for these holes (intersections of dashed lines).

The two sides of the disk are provided each with a reinforcement 8 constituted by several layers of a carbon cloth impregnated with a phenolic resin.

This disk can be obtained in the following manner from a premachined artificial graphite disk.

The two sides of this disk are covered with several layers of a carbon cloth maintained in place by a prepolymerised phenolic resin. In this instance, this covering is applied in the following way. On each side of the disk is placed a layer of carbon cloth which is swabbed with a prepolymerised phenolic resin and the same thing is done with the other layers. After partial polymerisation of the resin, a series of holes is machined and, finally, the assembly of the disk and its reinforcement is impregnated with a phenolic resin which is allowed to polymerise in known manner.

Further machining of the shoulder of joints and of the tube housings can then be effected if necessary.

Comparative tests have been performed on disks of tubular heat exchangers which were not reinforced and on disks of tubular exchangers according to this example. It was observed that the resistance to erosion of the disks according to this invention was increased considerably. Tests indicated that the amount of material removed, other things being equal, is up to six (6) times less than for not reinforced disks.

Additionally, reinforcing the two sides of the disks of a tubular exchanger increases considerably the resistance to bending.

Comparative tests were carried out with a non-reinforced impregnated graphite plate of a tubular exchanger and with an impregnated graphite disk 25 mm thick reinforced on both sides by a reinforcement 1 mm thick of layers of carbon cloth. It was noted that the flexural resistance of disks for tubular exchangers according to the invention increases by 40% relative to that of non-reinforced disks of tubular exchangers.

It is immediately seen that such improvement in flexural resistance whose main stress is bending is of great importance. In effect, if their flexural resistance is increased, it is possible to decrease their thickness.

It is evident that the foregoing examples serve to illustrate the invention, but that the same can be utilized in other applications without departing from the spirit and scope thereof.

What is claimed is:

1. A shaped resin impregnated graphitic article having on at least a part of its surface a reinforcement formed of fibers of carbon, graphite, glass, silica, alumina or boron, impregnated with a resin, said resin integrally uniting said article and said reinforcement, prepared by the process comprising;
    a. covering at least a part of said surface of said shaped graphitic article with said fibrous reinforcement,
    b. impregnating the resulting assembly with a resin, and
    c. allowing said resin to harden.
2. The article of claim 1, wherein said reinforcement is pre-impregnated with a resin.
3. The article of claim 1, wherein said article and said reinforcement are impregnated with the same resin.
4. The article of claim 1, wherein said resin is thermosetting or thermoplastic resin.
5. The article of claim 1, wherein said resin is a phenolic resin.
6. The article of claim 1, wherein said fibers are in the form of cloth, mats, wound threads or sheets.
7. The article of claim 1, consisting of a cylindrical block of a heat exchanger, said block having a fibrous reinforcement on each side.
8. The article of claim 1, consisting of a circular disk for a tubular exchanger, said disk having a fibrous reinforcement on both sides.
9. The article of claim 1, wherein said article is machined before impregnation with said resin.

* * * * *